United States Patent
He et al.

(10) Patent No.: US 11,157,479 B2
(45) Date of Patent: Oct. 26, 2021

(54) LEVERAGING A COLLECTION OF TRAINING TABLES TO ACCURATELY PREDICT ERRORS WITHIN A VARIETY OF TABLES

(71) Applicant: Microsoft Technology Licensing, LLC, Redmond, WA (US)

(72) Inventors: Yeye He, Bellevue, WA (US); Pei Wang, Burnaby (CA)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 256 days.

(21) Appl. No.: 16/378,155

(22) Filed: Apr. 8, 2019

(65) Prior Publication Data

US 2020/0320053 A1     Oct. 8, 2020

(51) Int. Cl.
*G06F 16/00* (2019.01)
*G06F 16/22* (2019.01)
(Continued)

(52) U.S. Cl.
CPC ........ *G06F 16/2282* (2019.01); *G06F 16/215* (2019.01); *G06F 17/18* (2013.01); *G06N 20/00* (2019.01)

(58) Field of Classification Search
CPC .... G06F 16/215; G06F 16/2282; G06F 17/18; G06F 40/177; G06N 20/00
(Continued)

(56) References Cited

U.S. PATENT DOCUMENTS 5,572,423 A * 11/1996 Church ................. G06F 40/232
715/257
5,845,306 A * 12/1998 Schabes ............... G06F 40/242
715/209
(Continued)

FOREIGN PATENT DOCUMENTS

EP          0415000 A2     3/1991
WO    2015190203 A1    12/2015

OTHER PUBLICATIONS

"International Search Report and Written Opinion Issued in PCT Application No. PCT/US2020/021627", dated Jun. 19, 2020, 8 Pages.
(Continued)

*Primary Examiner* — Michelle N Owyang
(74) *Attorney, Agent, or Firm* — Ray Quinney & Nebeker P.C; James Bullough

(57) ABSTRACT

The present disclosure relates to systems, methods, and computer-readable media for using a variety of hypothesis tests to identify errors within tables and other structured datasets. For example, systems disclosed herein can generate a modified table from an input table by removing one or more entries from the input table. The systems disclosed herein can further leverage a collection of training tables to determine probabilities associated with whether the input table and modified table are drawn from the collection of training tables. The systems disclosed herein can additionally compare the probabilities to accurately determine whether the one or more entries include errors therein. The systems disclosed herein may apply to a variety of different sizes and types of tables to identify different types of common errors within input tables.

20 Claims, 9 Drawing Sheets

(51) Int. Cl.
*G06F 16/215* (2019.01)
*G06N 20/00* (2019.01)
*G06F 17/18* (2006.01)

(58) Field of Classification Search
USPC .................................................. 707/600–899
See application file for complete search history.

(56) References Cited

U.S. PATENT DOCUMENTS

| | | | |
|---|---|---|---|
| 7,117,430 B2 | 10/2006 | Maguir et al. | |
| 2005/0234906 A1* | 10/2005 | Ganti | G06F 16/258 |
| 2012/0278290 A1 | 11/2012 | Pinch et al. | |
| 2013/0283156 A1* | 10/2013 | Al Badrashiny | G06F 40/232 |
| | | | 715/257 |
| 2018/0018579 A1* | 1/2018 | Xu | G06N 20/20 |
| 2019/0188255 A1* | 6/2019 | Mahmoud | G06F 40/232 |

OTHER PUBLICATIONS

"Bing Spell Check", Retrieved from: https://azure.microsoft.com/en-us/services/cognitive-services/spell-check/, Retrieved Date: Jan. 22, 2019, 15 Pages.
"Data planet", Retrieved from: https://www.data-planet.com/, Retrieved Date: Jan. 22, 2019, 01 Page.
Chakrabarti, et al., "Data services leveraging bing's data assets", In Journal of IEEE Data Engineering Bulletin, vol. 39, No. 3, Sep. 2016, pp. 1-14.
"Dresden Web Table Corpus", Retrieved from: https://wwwdb.inf.tu-dresden.de/misc/dwtc/, Retrieved Date: Jan. 22, 2019, 05 Pages.
"European spreadsheet risk interest group", Retrieved from: http://www.eusprig.org/horror-stories.htm, Retrieved Date: Jan. 22, 2019, 21 Pages.
"Google-api-spelling-java", Retrieved from: https://code.google.com/archive/p/google-api-spelling-java/, Retrieved Date: Jan. 22, 2019, 02 Pages.
"Openrefine", Retrieved from: http://openrefine.org/, Retrieved Date: Jan. 22, 2019, 04 Pages.
"Outlier detection", In Publication of Springer, 2005, pp. 1-16.
"Paxata", Retrieved from: https://www.paxata.com/, Retrieved Date: Jan. 22, 2019, 03 Pages.
"Paxata—Find & Fix Spelling Errors in Large Data Sets and Excel", Retrieved from: https://www.paxata.com/blog/find-fix-spelling-errors-in-large-data-sets-and-excel/, May 22, 2014, 03 Pages.
"Talend Data Services Platform Studio User Guide", Retrieved from: https://help.talend.com/reader/ztNTsvuA6OUYwnhO3e_YIQ/RPC5YthSGbD9HnalsQN_Cg, Retrieved Date: Jan. 22, 2019, 21 Pages.
"Trifacta", Retrieved from: https://www.trifacta.com/, Retrieved Date: Jan. 22, 2019, 03 Pages.
"Wiktionary", Retrieved from: https://www.wiktionary.org/, Retrieved Date: Jan. 22, 2019, 02 Pages.
Abedjan, et al., "Detecting data errors: Where are we and what needs to be done?", In Proceedings of the VLDB Endowment, vol. 9, Issue 12, Aug. 2016, pp. 993-1004.
Afrati, et al., "Repair checking in inconsistent databases: algorithms and complexity", In Proceedings of the 12th International Conference on Database Theory, Mar. 23, 2009, pp. 31-40.
Ahmad, et al., "A Type System for Statically Detecting Spreadsheet Errors", In Proceedings of 18th IEEE International Conference on Automated Software Engineering, Oct. 6, 2003, pp. 1-10.
Arning, et al., "A linear method for deviation detection in large databases", In Proceedings of the Second International Conference on Knowledge Discovery and Data Mining, Aug. 2, 1996, pp. 164-169.
Asavametha, Atipol, "Detecting bad smells in spreadsheets", In Master's Thesis of Oregon State University, Jun. 15, 2012, 66 Pages.

Bohannon, et al., "A cost-based model and effective heuristic for repairing constraints by value modification", In Proceedings of the ACM SIGMOD international conference on Management of data, Jun. 14, 2005, pp. 143-154.
Breunig, et al., "Lof: identifying density-based local outliers", In Proceedings of the ACM SIGMOD International Conference on Management of data, May 15, 2000, pp. 93-104.
Cafarella, et al., "Webtables: exploring the power of tables on the web", In Proceedings of the VLDB Endowment, vol. 1, Issue 1, Aug. 2008, pp. 538-549.
Casella, et al., "Statistical Inference", In Publication of Duxbury Press, 2001, 686 Pages.
Chandola, et al., "Outlier detection: A survey", In Proceedings of ACM Computing Surveys, Aug. 2007, pp. 1-83.
Chiang, et al., "Discovering data quality rules", In Proceedings of the VLDB Endowment, vol. 1, Issue 1, Aug. 2008, pp. 1166-1177.
Chu, et al., "Discovering denial constraints", In Proceedings of the VLDB Endowment, vol. 6, Issue 13, Aug. 2013, pp. 1498-1509.
Chu, et al., "Holistic data cleaning: Putting violations into context", In Proceedings of IEEE 29th International Conference on Data Engineering, Apr. 8, 2013, 12 Pages.
Chu, et al., "Katara: A data cleaning system powered by knowledge bases and crowdsourcing", In Proceedings of the ACM SIGMOD International Conference on Management of Data, May 31, 2015, pp. 1247-1261.
Cong, et al., "Improving data quality: Consistency and accuracy", In Proceedings of the VLDB Endowment, Sep. 23, 2007, pp. 1-12.
Dasu, et al., "Mining Database Structure; or, How to Build a Data Quality Browser", In Proceedings of ACM SIGMOD International Conference on Management of Data, Jun. 4, 2002, pp. 240-251.
Dou, et al., "Detecting table clones and smells in spreadsheets", In Proceedings of 24th ACM SIGSOFT International Symposium, Nov. 1, 2016, pp. 787-798.
Fan, et al., "Reasoning about record matching rules", In Journal of Accountancy, vol. 181, Issue 5, Aug. 2009, pp. 407-418.
Freeman, David, "How to make spreadsheets error-proof", In Journal of Accountancy, vol. 181, Issue, May 1996, 04 Pages.
Ganjisaffar, et al., "qspell: Spelling correction of web search queries using ranking models and iterative correction", In Proceedings of Spelling Alteration for Web Search Workshop, Jul. 2011, 05 Pages.
Golab, et al., "Data auditor: Exploring data quality and semantics using pattern tableaux", In Proceedings of VLDB Endowment, vol. 3, Issue 2, Sep. 1, 2010, pp. 1641-1644.
Gupta, et al., "Outlier detection for temporal data: A survey", In Journal of IEEE Transactions on Knowledge and Data Engineering, vol. 26, Issue 9, Sep. 2014, pp. 2250-2267.
Halevy, et al., "Goods: Organizing Google's Datasets", In Proceedings of the International Conference on Management of Data, Jun. 26, 2016, pp. 795-806.
Krizhevsky, et al., "ImageNet Classification with Deep Convolutional Neural Networks", In Journal of Advances in Veural Information Processing Systems, Dec. 3, 2012, pp. 1-9.
Hare, et al., "Forecast Snapshot: Self-Service Data Preparation, Worldwide, 2016", Retrieved from https://www.gartner.com/doc/3204817/, Feb. 9, 2016, 03 Pages.
He, et al., "An optimization model for outlier detection in categorical data", In Proceedings of International Conference on Intelligent Computing, Aug. 23, 2005, 12 Pages.
He, et al., "Transform-data-by-example (tde): an extensible search engine for data transformations", In Journal of the VLDB Endowment, vol. 11, Issue 10, Jun. 2018, pp. 1165-1177.
Hellerstein, Joseph M.., "Quantitative data cleaning for large databases", In Proceedings of United Nations Economic Commission for Europe, Feb. 27, 2008, pp. 1-42.
Hodge, et al., "A survey of outlier detection methodologies", In Journal of Artificial intelligence review, vol. 22, Issue 2, Oct. 2004, 43 Pages.
Huang, et al., "Auto-detect: Data-driven error detection in tables", In Proceedings of the International Conference on Management of Data, Jun. 10, 2018, pp. 1377-1392.
Huhtala, et al., "Tane: An efficient algorithm for discovering functional and approximate dependencies", In Computer Journal, vol. 42, Issue 2, Jan. 1, 1999, pp. 100-111.

(56) References Cited

OTHER PUBLICATIONS

Ilyas, et al., "Cords: automatic discovery of correlations and soft functional dependencies", In Proceedings of the ACM SIGMOD International conference on Management of data, Jun. 13, 2004, pp. 647-658.

Iseminger, et al., "Data types in Power BI Desktop", Retrieved from: https://docs.microsoft.com/en-us/power-bi/desktop-data-types, Apr. 10, 2019, 07 Pages.

Keogh, et al., "Towards parameter free data mining", In Proceedings of the tenth ACM SIGKDD international conference on Knowledge discovery and data mining, Aug. 22, 2004, pp. 206-215.

Kivinen, et al., "Approximate inference of functional dependencies from relations", In Journal of Theoretical Computer Science, vol. 149, Issue 1, Sep. 1995, pp. 129-149.

Knox, et al., "Algorithms for mining distance based outliers in large datasets", In Proceedings of 24th International Conference on Very Large Data Bases, Aug. 24, 1998, pp. 392-403.

Krishnan, et al., "BoostClean: Automated Error Detection and Repair for Machine Learning", In Journal of Computing Research Repository, Nov. 3, 2017, 15 Pages.

Hall, et al., "Smoothed Cross-Validation", In Journal of Probability theory and related fields, vol. 92, Issue 1, Mar. 1992.

Lee, M. Peter., "Bayesian statistics", In Journal of Arnold Publication, Jan. 1997, 44 Pages.

Lehmann, et al., "Testing statistical hypotheses", In Publication of Springer, Mar. 30, 2006.

Lieberman, Henry, "Your Wish is My Command: Programming by Example", In Publications of Morgan Kaufmann, Mar. 12, 2001, 443 Pages.

Lueck, Gord, "A Data-Driven Approach for Correcting Search Queries", In Spelling Alteration for Web Search Workshop, Jul. 19, 2011, 32 Pages.

Maimon, et al., "Data Mining and Knowledge Discovery Handbook: A Complete Guide for Practitioners and Researchers", In Publication of Springer, 2005, 17 Pages.

Maronna, et al., "Robust Statistics: Theory and Methods (with R)", In Publication of Wiley, Dec. 3, 2018, 09 Pages.

McSerry, et al., "Mechanism design via differential privacy", In Proceedings of 48th Annual IEEE Symposium on Foundations of Computer Science, Oct. 20, 2007, pp. 94-103.

Neyman, et al., "On the problem of the most efficient tests of statistical hypotheses", In Journal of Philosophical Transactions of the Royal Society of London Series A, Containing Papers of a Mathematical or Physical Character, vol. 231, Feb. 16, 1933, pp. 289-337.

Panko, Raymond R.., "What we know about spreadsheet errors", In Journal of Organizational and End User Computing, vol. 10, No. 2, Apr. 1, 1998, 33 Pages.

Parzen, Emanuel, "On Estimation of a Probability Density Function and Mode", In Journal of the annals of mathematical statistics, vol. 33, Issue 3, Sep. 1962, pp. 1065-1076.

Powell, et al., "Errors in operational spreadsheets: A review of the state of the art", In Proceedings of 42nd Hawaii International Conference on System Sciences, Jan. 5, 2009, pp. 1-8.

Rajpurkar, et al., "SQuAD: 100,000+ Questions for Machine Comprehension of Text", In Journal of Computing Research Repository, Jun. 16, 2016, 10 Pages.

Raman, et al., "Potter's wheel: An interactive data cleaning system", in Proceedings of the 27th International Conference on Very Large Data Bases, Sep. 11, 2001, 10 Pages.

Rekatsinas, et al., "Holoclean: Holistic data repairs with probabilistic inference", In Proceedings of the VLDB Endowment, vol. 10, Issue 11, Aug. 2017, pp. 1190-1201.

Ritze, et al., "Web Data Commons—Web Table Corpora", Retrieved from: http://webdatacommons.org/webtables/, Retrieved Date: Jan. 22, 2019, 03 Pages.

Schelter, et al., "Automating largescale data quality verification", In Proceedings of the VLDB Endowment, vol. 11, Issue 12, Aug. 2018, pp. 1781-1794.

Schutze, et al., "Introduction to Information Retrieval", In Cambridge University Press, Apr. 1, 2009, 581 Pages.

Singh, et al., "Melford: Using Neural Networks to Find Spreadsheet Errors", In Microsoft Technical Report of MSR-TR-2017-5, Jan. 31, 2017, pp. 1-13.

Singh, et al., "Transforming Spreadsheet Data Types using Examples", In Proceedings of the 43rd Annual ACM SIGPLAN-SIGACT Symposium on Principles of Programming Languages, Jan. 20, 2016, pp. 343-356.

Thorne, Simon, "An alternative modelling technique for the reduction of error in decision support spreadsheets", In Thesis of Cardiff Metropolitan University, Jan. 2008, 334 Pages.

Wyatt, Allen, "Changing Error Checking Rules", Retrieved From: https://excelribbon.tips.net/T006221_Changing_Error_Checking_Rules.html, May 2, 2015, 03 Pages.

Yakout, et al., "Don't be scared: use scalable automatic repairing with maximal likelihood and bounded changes", In Proceedings of the ACM SIGMOD International Conference on Management of Data, Jun. 22, 2013, pp. 553-564.

Zhao et al., "Controlling false discoveries during interactive data exploration", In Proceedings of the ACM International Conference on Management of Data, May 9, 2017, 13 Pages.

Ziemann, et al., "Gene name errors are widespread in the scientific literature", In Journal of Genome Biology, vol. 17, Issue 1, Aug. 23, 2016, 03 Pages.

* cited by examiner

LEVERAGING A COLLECTION OF TRAINING TABLES TO ACCURATELY PREDICT ERRORS WITHIN A VARIETY OF TABLES

CROSS-REFERENCE TO RELATED APPLICATIONS

N/A

BACKGROUND

Recent years have seen a precipitous rise in the use of computing devices (e.g., mobile devices, personal computers, server devices) to create, store, edit, and share data. Indeed, tools and applications for creating tables and other structured data are becoming more and more common. These data files often include a variety of common errors (e.g., incorrect numbers, misspelled names, functional dependency errors). As spreadsheet applications, charting applications, business intelligence (BI) products, and other applications that make use of tables (and other structured datasets) become more prevalent, existing tools and techniques for verifying accuracy of data included therein have become outdated and ineffective.

For example, conventional techniques for detecting errors within tables are often inaccurate or inflexible. Existing error detection methods are generally equipped to handle a single datatype or evaluate a limited distribution of values within a table. As a result, conventional error detection methods are generally inflexible or accurate only with respect to a select number of tables that fit a very narrow criteria.

In addition, because conventional error detection techniques generally involve a custom-made algorithm or an information technology (IT) expert equipped to analyze a specific set of data, evaluating digital tables using conventional techniques are often expensive or unhelpful to non-expert users. Indeed, because conventional approaches typically require substantial configurations from expert users before functioning properly, these error-detection approaches are often extremely expensive to implement within existing applications and end-users are often unable to effectively implement the required configurations. As a result, companies and other entities often limit evaluation of digital tables to high value datasets while simply ignoring errors that may be found in other "less-important" datasets.

These and other problems exist with regard to identifying errors within digital spreadsheets, tables, and various data files.

DETAILED DESCRIPTION

Figure 1:
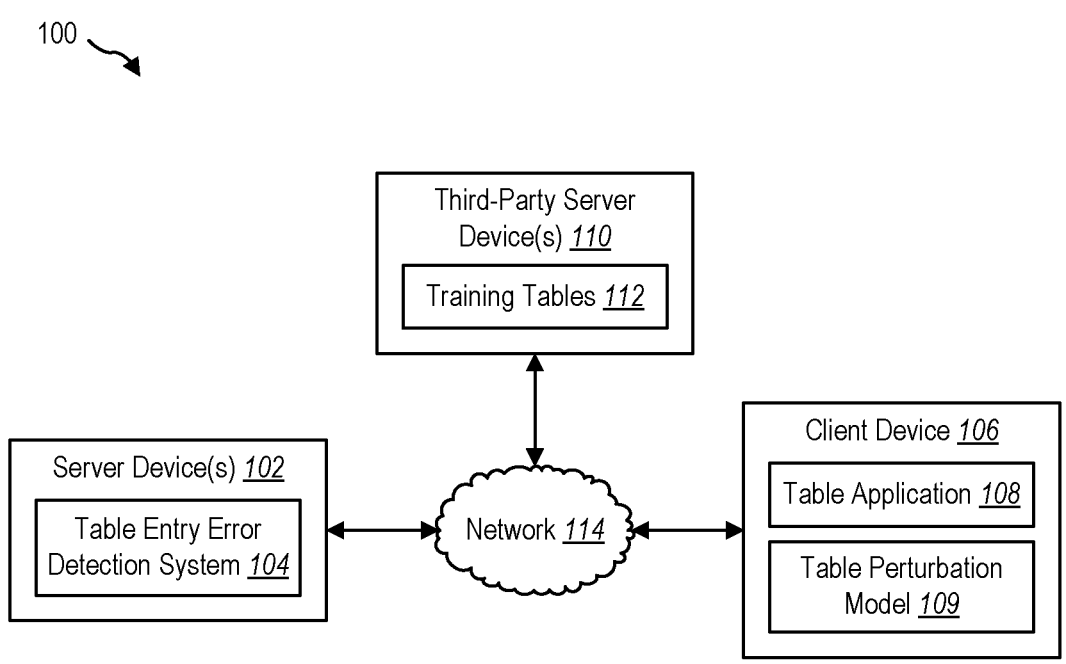
FIG. 1 illustrates an example environment including an automated table entry error detection system in accordance with one or more implementations.

The present disclosure relates to an automated table entry error detection system (or simply an "error detection system") trained to automatically identify predicted errors included within entries of a table or other structured set of data having entries organized in a number of rows and columns. In particular, as will be discussed in further detail below, the error detection system leverages a plurality of training tables (or other types of datasets) including values contained therein that provide a reference for determining whether an input table (or other type of input dataset) includes one or more errors. As will be discussed in further detail below, the error detection system can strategically modify (e.g., perturb) the input table and identify errors based on probabilities that the input table and a perturbed version of the input table are drawn from the plurality of training tables.

To illustrate, upon receiving an input table including a plurality of entries, an error detection system can generate a modified input table by removing one or more entries from the plurality of entries. As will be discussed in further detail below, the error detection system can compare the input table and modified input table to a collection of training tables to determine probabilities associated with whether one or more perturbed iterations of an input table (e.g., one or more modified input tables) and the input table are drawn from a collection of training tables. In particular, as will be discussed in further detail below, the error detection system can compare a probability that the input table is drawn from the collection of training tables (e.g., the input table includes a statistically similar distribution of values as tables from the collection of training tables) with a probability that a modified table is drawn from the collection of training tables.

The error detection system can accurately identify one or more errors within the input table in a number of ways and which may be applied to a variety of datatypes. For example, the error detection system can selectively identify one or more entries to remove from the input table in generating the modified input table. The specific entries may depend on a datatype of one or more columns, dependencies between associated columns, sizes of datasets, or other features of the input table. In one or more embodiments, the error detection system selectively identifies the entries to remove from the input table based on a preliminary evaluation of the input table and a prediction about whether the entries include errors.

As a further example, the error detection system can more efficiently and accurately determine whether errors exist in the input table by subsetting or otherwise featurizing the collection of training tables. In particular, as will be discussed in further detail below, the error detection system can identify a subset of training tables from the collection of training tables based on shared features (e.g., datatype, number of entries, number of rows, value prevalence) between the input table and subset of training tables from the collection of training tables. Using the identified subset of training tables having similar features as the input table, the error detection system can more accurately and efficiently determine probabilities associated with whether an input table and a modified input table are drawn from the collection of training tables.

Moreover, as will be discussed in further detail below, one or more embodiments of the error detection system can be implemented in an online or offline environment. For example, in one or more embodiments, the error detection system directly compares an input table to a collection of training tables as part of the process of identifying one or more errors contained within entries of the input table. In addition, or as an alternative, the error detection system can train a model (e.g., a machine learning model, a rule-based algorithm) based on identified trends or patterns detected within the collection of training tables. The model may be provided for implementation on a computing device (e.g., a server device, a client device) to enable the computing device to detect errors based on the training of the model.

The present disclosure includes a number of practical applications that provide benefits and/or solve problems associated with identifying errors within a variety of datasets. For example, by perturbing an input table and comparing both the input table and the resulting modified table to a collection of training tables, the error detection system can detect errors on a variety of tables having different datatypes and distributions. Indeed, by comparing hypothesis tests applied to both an input table and perturbed iterations of the input table, the error detection system can compare results of the hypothesis tests to accurately detect a variety of common errors.

Thus, rather than designing or constructing a unique and specialized test applicable to a unique set of data, the error detection system can more generally compare results of perturbing input tables having a variety of datatypes and distributions. Moreover, by comparing the input table and perturbed input table to the collection of training tables in accordance with one or more implementations described herein, the error detection system can additionally eliminate many false positives that custom-made error detection models often identify erroneously.

In addition, by subsetting a collection of training data based on shared features with an input table, the error detection system can improve upon the accuracy of performing hypothesis tests and increase the confidence with which the error detection system identifies errors within input tables. For example, as will be discussed in further detail below, by discarding or otherwise ignoring a portion of a collection of training tables that have different features as an input table, the error detection system can focus on relevant training data in training a table perturbation model and/or accurately identifying errors within entries of an input table. Moreover, by significantly reducing the quantity of training tables considered in determining the probabilities associated with the input and modified tables, the error detection system can improve the operation of the computing device (or system of multiple devices) itself by reducing the expense of storage and processing resources. Indeed, subsetting the collection of training data can enable more accurate identification of errors while utilizing fewer processing resources of a computing device on which the error detection system is implemented. This can additionally reduce the expense of bandwidth resources where the error detection system and/or collection of training resources are implemented between two or more computing devices.

In addition to selectively identifying potential errors within one or more input tables, the error detection system can additionally provide functionality in connection with a variety of software products to enable remediation of the identified potential errors. For example, the error detection system can provide one or more indicators of potential errors via a graphical user interface of a client device in conjunction with a presentation of the input table. The error detection system may additionally enable a user of the client device to interact with one or more graphical elements to confirm the potential error, refute the potential error, and/or remedy the potential error. Moreover, the error detection system can additionally refine one or more models for identifying errors based on one or more interactions by the user in conjunction with the input table and/or indications of potential errors identified by the error detection system.

As illustrated in the foregoing discussion, the present disclosure utilizes a variety of terms to describe features and advantages of an error detection system. Additional detail will now be provided regarding the meaning of such terms. For example, as used herein, a "table" or "digital table" refers to a set of entries (e.g., table entries) that include data therein and which make up the structure of the table. The set of entries may be organized by rows and columns and include values having a variety of datatypes. Values within respective entries may include text, numbers, alphanumeric values, formulas, Boolean operators, null values, or any other type of data capable of being added to a corresponding entry of a table. A table may include a single column of entries or multiple columns. In one or more embodiments, a table may refer to a discrete portion of entries organized by columns and/or rows within a spreadsheet file, electronic document, business intelligence (BI) product file, or other content file that includes one or multiple tables therein.

As used herein, a "training table" refers to a table from a collection or plurality of tables that are presumed to include clean data. For example, a collection of training tables may refer to web tables extracted from one or multiple commercial search engines. In addition, or as an alternative, the collection of training tables may include a set of proprietary test tables, or tables extracted from Wikipedia or other third-party source. Indeed, the collection of training tables may refer to one or multiple pluralities of tables extracted from a variety of sources and which are presumed to be clean or mostly clean (e.g., having no errors or limited errors). Similar to tables discussed above, the collection of training tables may include training tables having any number of rows and columns and cells that include values of a variety of datatypes.

Additional detail will now be provided regarding an automated table entry error detection system in relation to illustrative figures portraying example implementations. For example, FIG. 1 illustrates an example environment 100 that includes a schematic diagram of a server device(s) 102 having a table entry error detection system 104 (or simply "error detection system 104") implemented thereon. The environment 100 further includes a schematic diagram of a client device 106 having a table application 108 thereon. The client device 106 may additionally have a table perturbation model 109 thereon. The environment 100 further includes one or more third-party server device(s) 110 having a collection of training tables 112 thereon.

As shown in FIG. 1, the server device(s) 102, client device 106, and third-party server device(s) 110 can communicate with each other directly or indirectly through a network 114. The network 114 may include one or multiple networks and may use one or more communication platforms or technologies suitable for transmitting data. The network 114 may refer to any data link that enables the transport of electronic data between devices and/or modules of the environment 100. The network 114 may refer to a hardwired network, a wireless network, or a combination of hardwired and wireless networks. In one or more embodiments, the network 114 includes the Internet.

The client device 106 may refer to various types of computing devices. For example, the client device 106 may include a mobile device such as a mobile telephone, a smartphone, a PDA, a tablet, or a laptop. Additionally, or alternatively, the client device 106 may include a non-mobile device such as a desktop computer, server device, or other non-portable device. In addition, the server device(s) 102, 110 may similarly refer to various types of computing devices. Each of the client device 106 and server devices 102, 110 may include features and functionality described below in connection with FIG. 7.

As shown in FIG. 1, the client device 106 includes a table application 108. The table application 108 may refer to any spreadsheet application, document application, business intelligence (BI) product, or any software product or application that enables the client device 106 to create, edit, and/or display tables via a graphical user interface of the client device 106. In one or more embodiments, one or more features and functionality described in connection with the error detection system 104 may be implemented as part of the table application 108. In one or more embodiments, the table application 108 refers to a web application that provides access to functionality related to creating, editing, and/or displaying tables provided via the server device(s) 102.

As mentioned above, and as will be discussed in further detail below, the error detection system 104 may receive or otherwise access an input table including a plurality of entries. The input table may refer to a table stored on the client device 106 and/or any table that has dirty data (e.g., unchecked or unverified data) thereon. As an example, the input table may refer to a table received from the client device 106 over the network 114. The error detection system 104 can additionally access the collection of training tables 112 stored across one or more of the third-party server device(s) 110.

In one or more embodiments, the error detection system 104 generates a modified input table based on the input table. In particular, as will be discussed further below, the error detection system 104 can perturb the input table in a variety of ways to generate a modified input table in which one or more entries from the input table have been removed. For example, the error detection system 104 can randomly or selectively identify an entry (or multiple entries) from the input table to remove from the input table to generate a modified input table having one or more fewer entries than the input table. Further examples describing how one or more entries may be selected for removal are provided below.

The error detection system 104 may utilize the multiple tables (e.g., the input table and modified input table) to determine a likelihood that the tables are drawn from the collection of training tables 112. In particular, the error detection system 104 may perform hypothesis tests on the tables to determine likelihoods (e.g., probabilities) that the tables are normal or defined as statistically similar to training tables drawn from the collection of training tables. More specifically, the error detection system 104 may perform a likelihood ratio (LR) test that involves comparing probabilities associated with both the input table and the modified input table being drawn from the collection of training tables 112. Additional detail in connection with determining and comparing probabilities is discussed below.

Based on the comparison between the probabilities, the error detection system 104 can determine whether an entry removed from the input table is likely to contain an error. In particular, where the comparison between the probabilities indicates a surprising or threshold difference between a first probability that the input table is drawn from the collection of training tables 112 and a second probability that the modified input table is drawn from the collection of training tables 112, the error detection system 104 can determine with a certain level of confidence (e.g., depending on the ratio) that the entry removed from the input table includes an error. The error detection system 104 can additionally implement a number of features and functionality to improve upon the accuracy and efficiency with which errors are detected within input tables. Further detail in connection with example features and functionality that improve upon this model will be provided below in connection with additional figures.

As mentioned above, the error detection system 104 can implement one or more of an online or an offline process of detecting errors within tables. For instance, in one or more embodiments, the error detection system 104 performs a direct comparison between the input table and the collection of training tables to determine probabilities associated with the input table and modified input table(s) and identifying errors within respective entries of the input table. In this example, the error detection system 104 may be implemented wholly or partially on the server device(s) 102

Alternatively, the error detection system 104 may perform an offline training of a table perturbation model 109 in which the error detection system 104 trains the table perturbation model 109 to perform a similar process of determining whether an error exists within a table based on a comparison of probabilities associated with whether an input table and modified input table are drawn from a collection of training tables. For instance, the error detection system 104 can train or otherwise generate the table perturbation model 109 and provide the table perturbation model 109 to be implemented locally on the client device 106. In one or more embodiments, the error detection system 104 implements the table perturbation model 109 on the server device(s) 102.

While FIG. 1 illustrates an example environment including a particular number and arrangement of the server device(s) 102, client device 106, and third-party server device(s) 110, it will be understood that the environment 100 may include any number of devices. For example, the environment 100 may include the error detection system 104 implemented wholly on the server device(s) 102 (as shown) or across multiple devices. In one or more implementations, the error detection system 104 is implemented on a cloud computing system including the server device(s) 102. Alternatively, the error detection system 104 may be implemented in whole or in part on the client device 106.

Figure 2A:
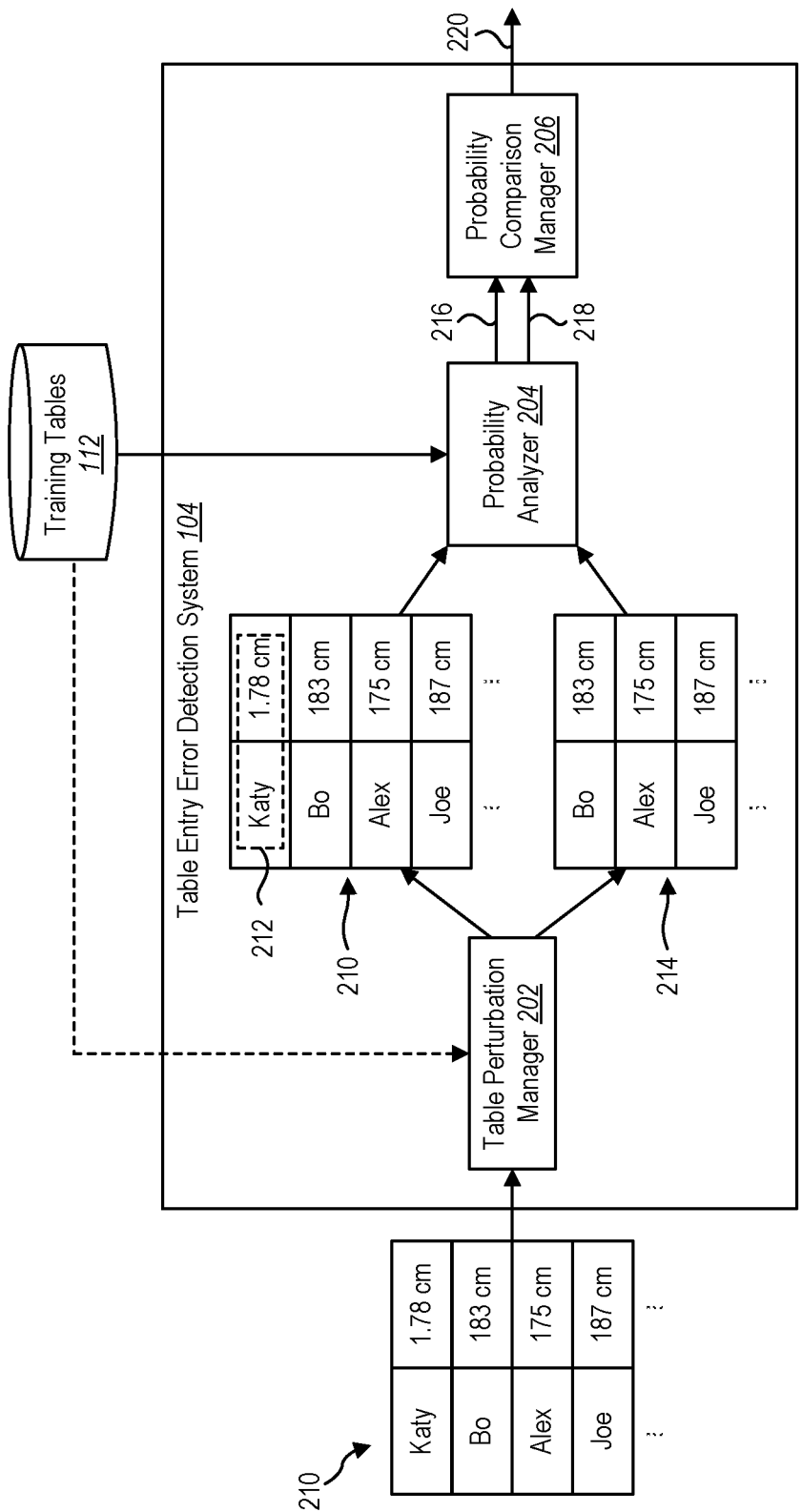
FIGS. 2A-2C illustrate example processes for implementing the table entry error detection system to automatically identify errors within a variety of tables in accordance with one or more implementations.
Figure 2B:
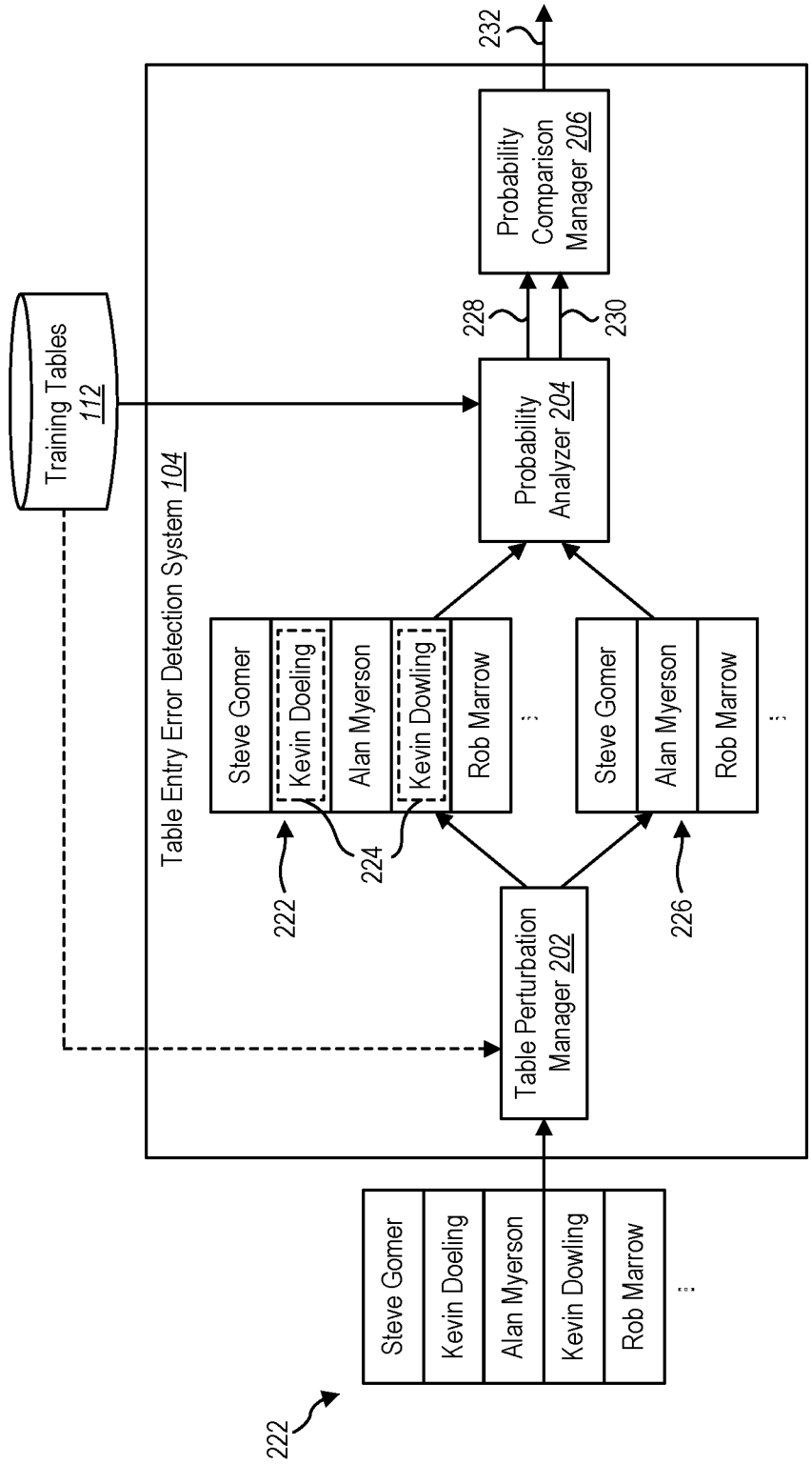
Figure 2C:
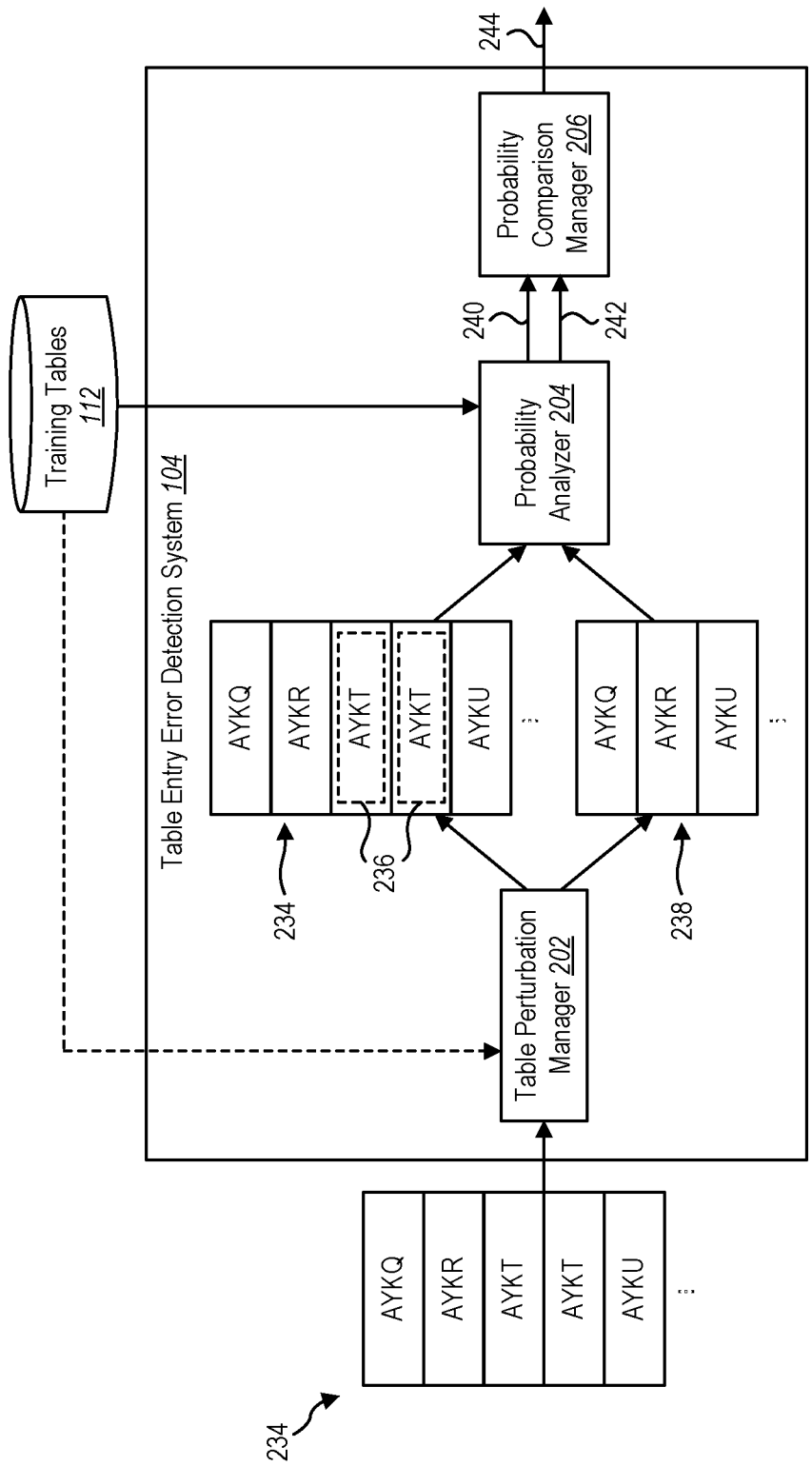

Moving on to FIGS. 2A-2C, these figures provide illustrative examples in which the error detection system 104 may be used to identify a variety of common errors within tables of different varieties. For example, FIG. 2A illustrates an example in which the error detection system 104 may be implemented to identify a numerical error within a table that shows individuals and associated heights. As another example, FIG. 2B illustrates an example in which the error detection system 104 is implemented to identify a spelling error from a listing of names. As a further example, FIG. 2C illustrates an example in which the error detection system 104 is implemented to identify an error from a table that includes a list of unique identifiers. It will be understood that features and functionality in connection with each of the respective figures are provided by way of example and may similarly apply to other examples and embodiments described herein.

As mentioned above, FIG. 2A illustrates an example framework for identifying an error within an input table including a listing of names and associated heights. As shown in FIG. 2A, the error detection system 104 includes a table perturbation manager 202, a probability analyzer 204, and a probability comparison manager 206.

The table perturbation manager 202 may receive the input table 210. In this example, the input table 210 includes a list of names and associated heights (in centimeters) corresponding to respective individuals. As shown in FIG. 2A, a first individual (Katy) is listed at 1.78 centimeters, a second individual (Bo) is listed at 183 centimeters, a third individual (Alex) is listed at 175 centimeters, and a fourth individual (Joe) is listed at 187 centimeters. The input table 210 may additionally include any number of additional entries having corresponding values therein.

Upon receiving the input table 210, the table perturbation manager 202 can provide a number of tables as input to a probability analyzer 204. For example, the table perturbation manager 202 can provide the input table 210 including an original listing of names and associated height values as a first input to the probability analyzer 204. In addition, the table perturbation manager 202 can identify an entry 212 to remove from the input table 210 to generate a modified table 214 that excludes the identified entry 212. The table perturbation manager 202 can provide the modified table as a second input to the probability analyzer 204.

The table perturbation manager 202 may identify the entry 212 to remove from the input table 210 in a number of ways. For example, in one or more embodiments, the table perturbation manager 202 iteratively or randomly identifies an entry and provides the pair of tables 210, 214 as inputs to the probability analyzer 204. The table perturbation manager 202 may perform this process multiple times until identifying one or more entries predicted to include an error. Alternatively, in one or more embodiments, the table perturbation manager 202 selectively identifies the entry 212 based on a predictive criteria.

For example, the table perturbation manager 202 may recognize that the second column of the input table 210 includes a numeric distribution of numerical values. Based on this determination, the table perturbation manager 202 can identify the entry 212 based on various analysis methods applicable to a numeric distribution. For instance, the table perturbation manager 202 can apply a median-absolute-deviation model, a distance-based outlier model, or a density-based outlier factor model to identify the entry of 1.78 centimeters as an outlying value relative to other height values within the input table 210, and therefore more likely to be erroneous than other values within the input table 210.

In one or more embodiments, the table perturbation manager 202 applies one of the above analysis methods (or other relevant analysis) to identify the entry 212 independent of identified trends or patterns from the collection of training tables 112. Alternatively, in one or more embodiments and as shown in FIG. 2A, the collection of training tables 112 (or data obtained from the collection of training tables 112) may optionally be provided as a training input or parameter for more accurately predicting entries for removal based on similar types of training tables.

The probability analyzer 204 may analyze the input table 210 and the modified table 214 to determine probabilities associated with whether the respective tables could be drawn from the collection of tables 112. As used herein, a table may be considered "drawn from" a collection of training tables where the table includes a similar distribution of values to other tables from within the collection of training tables. Accordingly, because an unchecked input table that includes dirty data is likely not taken directly from the collection of training tables that are made up of presumably clean data, a determination that the input table is drawn from the collection of training tables or otherwise hypothetically found therein may refer to a determination of a similarity metric between values of the input table and the collection of training tables 112. Accordingly, the probability analyzer 204 may determine whether the input table 210 and modified table 214 are drawn from the collection of training tables 112 by determining a measure of similarity or likeness between the values included within the respective tables.

As shown in FIG. 2A, the probability analyzer 204 may determine a first probability 216 that the input table 210 is drawn from the collection of training tables 112. As mentioned above, this first probability 216 may refer to a measurement value of likeness or similarity between the values from the input table 210 and the collection of training tables 112. As further shown in FIG. 2B, the probability analyzer 204 may determine a second probability 218 that the modified table 214 is drawn from the collection of training tables 112. Similar to the first probability 216, this second probability 218 may refer to a measurement value of likeness or similarity between the values of the input table 210 and the collection of training tables 112.

As shown in FIG. 2A, the probability analyzer 204 can provide the first probability 216 and the second probability 218 as inputs to the probability comparison manager 206. The probability comparison manager 206 may determine an output 220 identifying the entry 212 as including an error (e.g., an erroneous height value) based on a comparison between the first and second probabilities 216-218. In one or more embodiments, the probability comparison manager 206 generates the output 220 indicating an error (or absence of an error) based on a ratio between the probabilities 216-218.

In particular, where a ratio between the first probability 216 and the second probability 218 is less than a threshold or otherwise indicates a surprising difference between the likelihood that the input table 210 and the modified table 214 are drawn from the collection of training tables 112, the probability comparison manager 206 may conclude that the entry 212 includes an error therein. Accordingly, the output 220 would indicate that the entry 212 includes a potential or predicted error. Alternatively, where the ratio between the first probability 216 and the second probability 218 indicates a threshold or surprising difference between the likelihood that the input table 210 and the modified table 214 are drawn from the collection of training tables 112, the probability comparison manager 206 may determine that the entry 212 removed from the input table 210 likely does not include an error therein. Accordingly, the output 220 would indicate that the entry 212 does not include an error.

Referring to the specific example shown in FIG. 2A, the first probability 216 would likely indicate a low similarity metric between the input table 210 and the collection of training tables 112 because the collection of training tables 112 may fail to include (or include very few) training tables having a similar distribution of values as the distribution of height values in which the first individual (Katy) is 1.78 centimeters tall. However, because the entry including the outlying value of 1.78 centimeters is removed from the modified table 214, the second probability 218 may be significantly higher as the collection of training tables 112 would likely include a significantly higher number of training tables having a similar distribution of values as the modified table 214 with the entry 212 removed.

Based on this surprising or threshold difference in the probabilities 216-218, the error detection system 104 may conclude that the entry 212 includes an error. In response, the error detection system 104 can tag the entry 212 for display via a graphical user interface of the client device 106. This may include adding metadata to the entry including an indication of the probable error. In one or more embodiments, the error detection system 104 generates a report including an identification of one or multiple errors within the input table.

It will be understood that the error detection system 104 may implement variations of the above process. For example, while FIG. 2A illustrates an example in which two tables (e.g., the original input table 210 and a single modified table 214) are provided as inputs to the probability analyzer 204, the table perturbation manager 202 can provide any number of modified tables in addition to the input table 210 as inputs to the probability analyzer 204. For example, the error detection system 104 may iteratively perturb the input table any number of times to generate a corresponding number of modified tables. The error detection system 104 can additionally determine a corresponding number of probability values corresponding to similarities between the modified tables and the collection of training tables. The error detection system 104 may then compare the various probabilities to identify surprising or threshold differences in probability values between probability values associated with the modified tables and the original input table to identify multiple errors.

As another example, while FIG. 2A illustrates an example in which the error detection system 104 identifies a single entry 212, the error detection system 104 can identify multiple entries for removal from the input table 210 when generating the modified table 214. For example, where the error detection system 104 determines that two or more entries have outlying values that may include errors, the error detection system 104 may remove the two or more entries from the input table when generating the modified table.

In one or more embodiments, the error detection system 104 removes a number of table entries corresponding to a maximum perturbation value. For example, because removing too many values may diminish the reliability of the output 220, the error detection system 104 may apply a maximum perturbation value indicating a maximum number of entries or a maximum percentage of entries that the error detection system 104 may not exceed in identifying entries to remove from the input table when generating the modified table. The maximum perturbation value may be based on a total number of entries in the input table 210, a number of rows of the input table 210, and/or a datatype of entries within one or more select columns of the input table 210.

Moving onto FIG. 2B, this figure illustrates a similar framework for identifying errors within a different input table including different datatypes and having a different structure of entries. Similar to FIG. 2A, the error detection system 104 includes a table perturbation manager 202, a probability analyzer 204, and a probability comparison manager 206.

Similar to one or more embodiments described above, the table perturbation manager 202 may receive an input table 222. In this example, the input table 222 includes a single column of first and last names. Specifically, the input table 222 includes a listing of names such as "Steve Gomer," "Kevin Doeling," "Alan Myerson," "Kevin Dowling," and "Rob Marrow." The input table 222 may include any number of additional names.

The table perturbation manager 202 can identify entries 224 to remove from the input table 222 to generate the modified table 226. As mentioned above, the table perturbation manager 202 can identify the entries 224 to remove in a number of ways and depending on various factors. For instance, in contrast to the numeric distribution discussed above in connection with FIG. 2A, the table perturbation manager 202 may recognize that the input table 222 includes a listing of names. Based on this determination, the table perturbation manager 202 can apply one of a number of models to the input table 222 to identify the entries 224. In one or more embodiments, the table perturbation manager 202 applies a minimum pairwise edit-distance (MPD) model based on a minimum number of edits between different pairs of names. Alternatively, the table perturbation manager 202 may implement other models such as a fuzzy group-by model, a spell-checker model (e.g., a commercial spell checking application), or a knowledge-based model. As shown in FIG. 2B, using an MPD model, the table perturbation manager 202 identifies the names "Kevin Doeling" and "Kevin Dowling" as similar names that potentially include spelling errors.

The table perturbation manager 202 may provide the input table 222 and the modified table 226 as inputs to the probability analyzer 204. The probability analyzer 204 may analyze a distribution of the values from the tables 222, 226 to determine probabilities associated with whether the input table 222 and the modified table 226 are drawn from the collection of training tables 112. In particular, the probability analyzer 204 may determine a first probability 228 associated with a measure of similarity between the input table 222 and the collection of training tables 112 and a second probability 230 associated with a measure of similarity between the modified table 214 and the collection of training tables 112. The probability analyzer 204 may additionally provide the probabilities 228-230 as inputs to the probability comparison manager 206.

Similar to the example described in FIG. 2A, the probability comparison manager 206 can compare the probabilities 228-230 associated with the respective tables 222, 226 to determine an output 232 indicating the presence or absence of a potential error corresponding to the entries 224 removed from the input table 222. Based on the output 232, the error detection system 104 may provide an indication of the potential error(s) via a graphical user interface of the client device 106 in conjunction with a presentation of the input table 222 (e.g., within a spreadsheet displayed by the client device 106).

Moving onto FIG. 2C, this figure illustrates a similar framework for identifying errors within a different input table including different datatypes and having a different structure of entries. Similar to FIGS. 2A-2B, the error detection system 104 includes a table perturbation manager 202, a probability analyzer 204, and a probability comparison manager 206.

Similar to one or more embodiments described above, the table perturbation manager may receive an input table 234. In this example, the input table 234 includes a column of unique identifiers such as "AYKQ," "AYKR," "AYKT," "AYKT," and "AYKU." The input table 234 may include any number of additional values.

The table perturbation manager 202 can identify entries 236 to remove from the input table 234 to generate a modified table 238. As mentioned above, the table perturbation manager 202 can identify the entries 236 to remove in a number of ways and depending on various factors. For instance, in contrast to the numbers and names discussed above, the table perturbation manager 202 may recognize that the input table 234 includes a listing of rare values. Based on this determination, the table perturbation manager 202 may apply one of a number of analyses to the input table 234 such as a unique-row ratio model, a unique-value ratio model, or other applicable analysis model. As shown in FIG. 2C, the table perturbation manager 202 may identify two identical entries 236 to remove from the input table 234 in generating the modified table 238.

The table perturbation manager 202 may provide the input table 234 and modified table 238 as inputs to the probability analyzer 204. The probability analyzer 204 may analyze a distribution of the values of the tables 234, 238 to determine probabilities associated with whether the input table 234 and the modified table 238 are drawn from the collection of training tables 112. In particular, the probability analyzer 204 can determine a first probability 240 associated with the input table 234 and a second probability 242 associated with the modified table 238. The probability analyzer 204 may additionally provide the probabilities 240-242 as inputs to the probability comparison manager 206. Similar to one or more embodiments described above, the probability comparison manager 206 can generate an output 244 that indicates the presence or absence of errors within the entries 236 removed from the input table 234.

While FIGS. 2A-2C relate to different types of input tables having different structures, different datatypes, and different distributions of values, the error detection system 104 may nonetheless identify errors within the respective input tables using a similar framework. This provides additional flexibility over conventional methods that involve custom-made algorithms or models that have limited applicability to tables of similar structures, entries of similar datatypes, and/or a limited scope of value distributions. Accordingly, in view of these examples and other embodiments described herein, it will be appreciated that the error detection system 104 may implement a similar framework to accurately identify errors in a variety of different tables.

Figure 3:
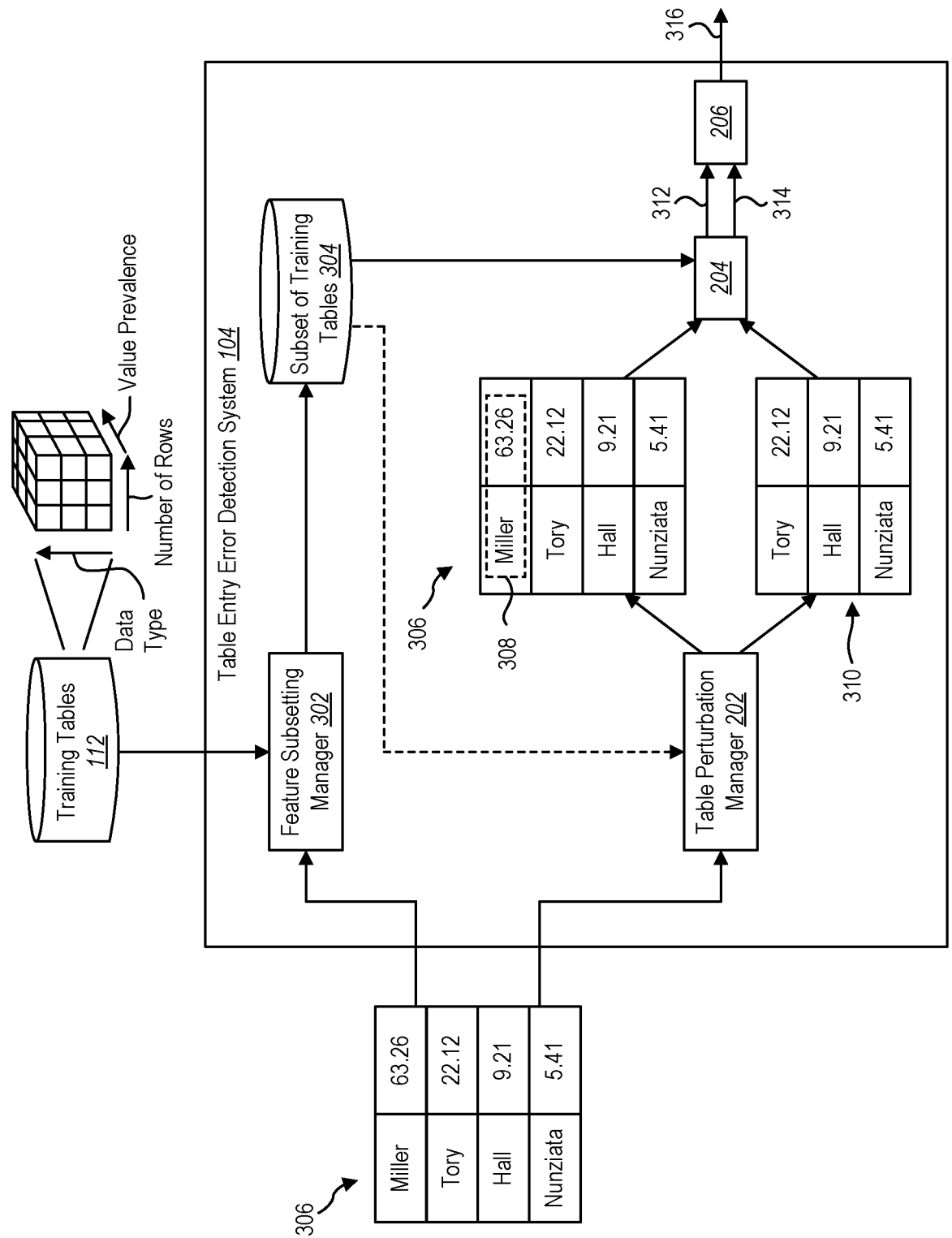
FIG. 3 illustrates another example process for subsetting training data and automatically identifying errors within an example table based on the subsetted training data in accordance with one or more implementations.

FIG. 3 illustrates a further example framework of the error detection system 104 that involves subsetting or featurizing the collection of training tables 112 to more accurately identify one or more errors within entries from an input table. As shown in FIG. 3, the error detection system 104 includes the table perturbation manager 202, the probability analyzer 204, and the probability comparison manager 206. In addition, the error detection system 104 may include a feature subsetting manager 302 that generates or otherwise identifies a subset of training tables 304 based on shared features between the subset of training tables 304 and an input table 306.

As shown in FIG. 3, the error detection system 104 may receive an input table 306 including a listing of names and associated values (e.g., percentages). In this example, the input table 306 includes a listing of candidates and associated election results. The input table 306 may be provided as an input to the feature subsetting manager 302. Based on the input table 306, the feature subsetting manager 302 may identify one or more features of the input table 306 to use in generating or otherwise identifying the subset of training tables 304 based on the one or more features of the input table 306. For instance, the feature subsetting manager 302 may identify features of the input table 306 including a datatype of entries from the input table, a number of entries of the input table, a number of rows of entries, a value prevalence associated with values within entries of the input table 306 and other characteristics of the input table 306.

The feature subsetting manager 302 may consider a single feature (e.g., datatype of entries within one or both columns of the input table 306) or a combination of multiple features in subsetting the collection of training tables 112. For instance, the feature subsetting manager 302 may identify a subset of training tables 304 including names and associated numbers and having the same number of rows or a relatively few number of rows (e.g., 10 or fewer rows). In addition, because the names and numbers are perhaps not as rare as user identification numbers or alphanumeric combinations of values, the feature subsetting manager 302 may exclude listings of rare tokens (e.g., rare values) when identifying the subset of training tables 304.

Similar to one or more embodiments discussed above, the input table 306 may be provided as an input to the table perturbation manager 202. In one or more implementations, the subset of training tables 304 is also provided as input to the table perturbation manager 202 to aid in the determination of an entry 308 to remove from the input table 306 for generating a modified table 310. As shown in FIG. 3, the table perturbation manager 202 may determine that the percentage associated with the name "Miller" is an outlier value and could potentially have an error.

The table perturbation manager 202 may provide the input table 306 and the modified table 310 to the probability analyzer 204 to determine probabilities that the respective tables 306, 310 are drawn from the collection of training tables 112. In particular, the probability analyzer 204 may determine the probabilities based on a comparison of the subset of training tables 304 (e.g., rather than the entire collection of training tables 112, which may include many dissimilar types of tables as the input table 306 and modified table 310). As shown in FIG. 3, the probability analyzer 204 may generate a first probability 312 associated with a similarity between the input table 306 and the tables from the subset of training tables 304 and a second probability 314 associated with a similarity between the modified table 310 and the subset of training tables 304.

The probability analyzer 204 may provide the probabilities 312-314 as inputs to the probability comparison manager 206 for generating an output 316 indicating whether an error exists within the removed entries 308. Where conventional systems may determine that the outlying numerical value associated with "Miller" is erroneous because it is an outlying value, the subset of training tables 304 will likely include similar types of tables that include election values and/or similar listings of names and associated percentages. As a result, the error detection system 104 may see a higher ratio between the first probability 312 and the second probability 314 than would be expected with other types of removed outlying values. This result would indicate that the removal of the entries 308 does not cause a surprising difference between the first probability and the second probability as seen in other examples herein. Accordingly, the error detection system 104 may determine that the removed entries 308 do not include any errors and take no further action in connection with providing an indicator to a user of a client device 106 about a potential error within the input table 306.

Figure 4:
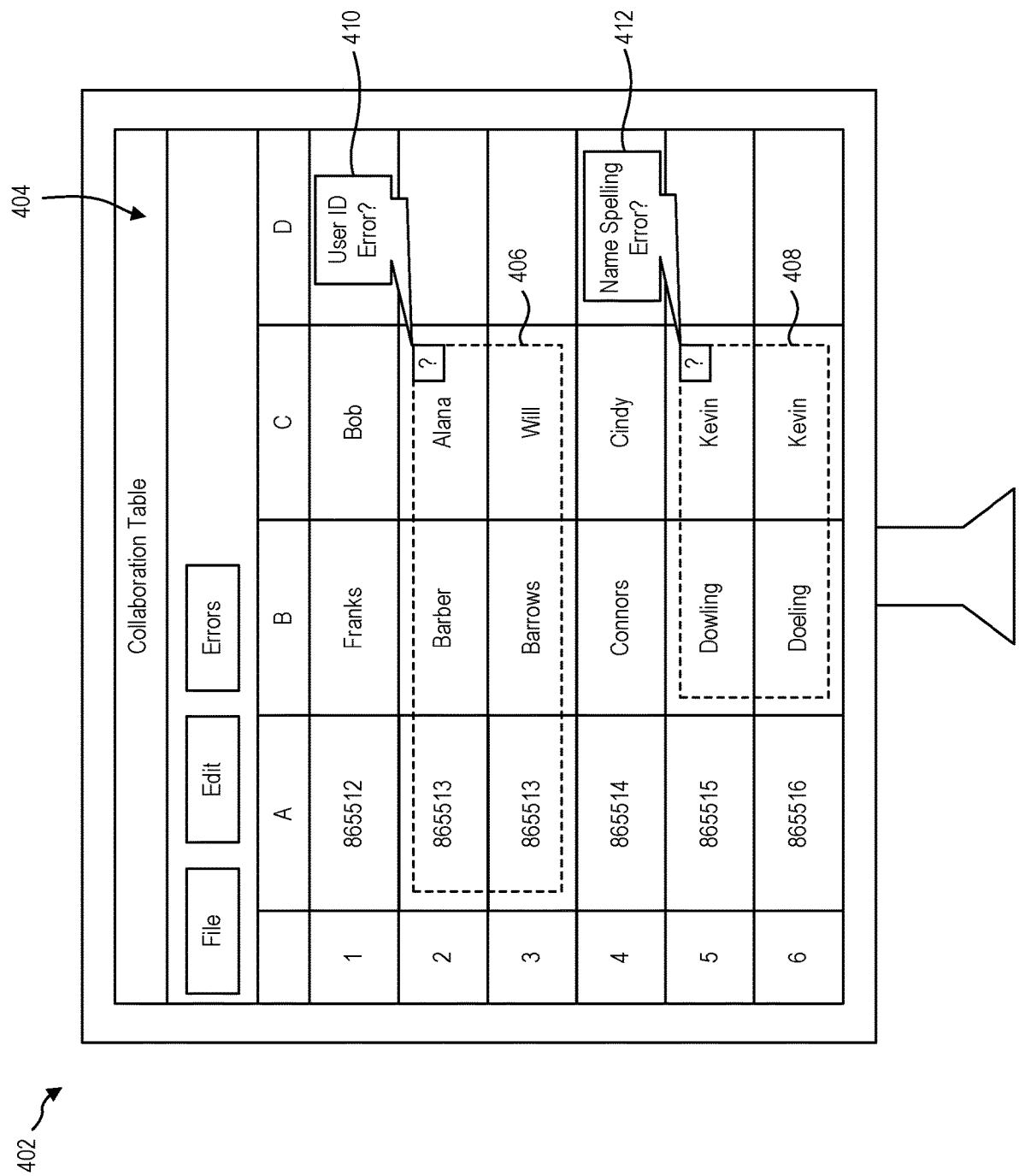
FIG. 4 illustrates an example graphical user interface including a display of a spreadsheet showing predicted errors tagged using the table entry error detection system in accordance with one or more implementations.

FIG. 4 illustrates an example implementation in which the error detection system 104 provides one or more indicators of detected errors via a graphical user interface of a client device. In particular, FIG. 4 illustrates an example client device 402, which may include similar features as discussed above in connection with the client device 106 shown in FIG. 1. As shown in FIG. 4, the client device 402 includes a graphical user interface 404 showing a display of a spreadsheet application in which a table is presented.

In accordance with one or more embodiments described herein, the error detection system 104 may identify a first group of entries 406 and a second group of entries 408 that include errors that have been flagged based on a comparison of probabilities determined for the respective tables. For instance, the error detection system 104 may identify the first set of entries 406 based on identifying two identical user identifiers in the first column (column A) and a comparison of probabilities between an input table and modified version of the input table in which the entries 406 were removed from the input table. Similarly, the error detection system 104 may identify the second set of entries 408 based on the detected misspelling between "Dowling" and "Doeling" similar to the example shown in FIG. 2B.

In addition to identifying and flagging entries including predicted errors, the error detection system 104 may additionally provide one or more graphical elements that enable a user of the client device 402 to edit or otherwise dig deeper into the potential error within the table. For example, the error detection system 104 may provide a first graphical element 410 indicating a potential userID error for the first set of entries 406. In addition, the error detection system 104 may provide a second graphical element 412 indicating a potential name spelling error for the second set of entries 408.

Additional detail will now be provided in connection with example use cases in which the error detection system 104 is implemented consistent with one or more embodiments described above in connection with FIGS. 1-4. In particular, the following description involves a perturbation-based framework with a hypothetical analysis in which, given a set of training tables (T) (e.g., the collection of training tables 112) and a new dataset (D) (e.g., an input table), the error detection system 104 can perturb D by removing all possible subsets of entries $O \subset D$ that are sufficiently small (where O is a subset of D). The error detection system 104 may then compare a probability that D and the perturbed $D_O^\mathcal{P} = D \setminus O$ is drawn from T, denoted as $P(D|T)$ and $P(D_O^\mathcal{P}|T)$, respectively. In particular, consistent with one or more embodiments described above, where a comparison indicates a significant quantity of change between the probabilities, the error detection system 104 may determine that an error exists within the subsets of entries (e.g., the entries removed from D).

More specifically, the error detection system 104 may implement a perturbation framework in which the error detection system 104 removes a subset of rows $O \subset D$ of size up to $\varepsilon$ (e.g., a maximum perturbation value) where $|O| \leq \varepsilon$. Indeed, the set of all perturbations up with a maximum perturbation value of E can be denoted as:

$$\mathcal{P}_{(D,\varepsilon)} = \{D_O^\mathcal{P} | \forall O \in D, |O| \leq \varepsilon\}$$

Consistent with one or more embodiments discussed above, the $\varepsilon$ value can be parameterized as up to E number of rows in D (e.g., a threshold number of rows, a threshold percentage of rows).

Upon perturbing D less than the maximum perturbation value, the error detection system 104 can additionally apply a series of hypothesis tests including a null hypothesis ($H_0$) in which D is presumed as normal (e.g., no errors) and defined as statistically similar to tables drawn from the training tables (T). The series of hypothesis tests may additionally include an alternative hypothesis ($H_1$) in which D is not presumed as normal due to the perturbed subset; however, after removing the identified entries (O), the perturbed dataset becomes normal and statistically similar to tables drawn from the training tables (T).

Based on the hypothesis tests, the error detection system 104 can apply a likelihood ratio test in which the error detection system 104 estimates the likelihood of the two hypotheses based on observed evidence, denoted as $P(H_0|evidence)$ and $P(H_1|evidence)$ and in which the likelihood ratio (LR) is denoted as:

$$LR = \frac{P(H_0 | \text{evidence})}{P(H_1 | \text{evidence})}$$

In addition, given a fixed significance level $\alpha$, the error detection system 104 can reject the null hypothesis $H_0$ where $LR < \alpha$.

Moreover, it will be understood that the "evidence" for reasoning may include D and T (both of which may be generated from the same underlying distribution). Accordingly, LR may be expressed as:

$$LR = \frac{P(H_0 | D, T)}{P(H_1 | D, T)} = \frac{P(D | H_0, T)}{P(D_O^\mathcal{P} | H_1, T)} \frac{P(H_0 | T)}{P(H_1 | T)} \alpha \frac{P(D | H_0, T)}{P(D_O^\mathcal{P} | H_1, T)}$$

Moreover, since $H_0$ presumes that D is similar to tables drawn from T, $P(D|H_0,T)$ may be estimated as the likelihood of drawing tables similar to D from T. On the other hand, $H_1$ states that after removing O, $D_O^\mathcal{P} = D \setminus O$ is similar to tables drawn from T. Considering this, LR may be expressed as:

$$LR = \frac{P(H_0 | D, T)}{P(H_1 | D, T)} = \frac{P(D | T)}{P(D_O^\mathcal{P} | T)} \frac{P(H_0 | T)}{P(H_1 | T)} \alpha \frac{P(D | T)}{P(D_O^\mathcal{P} | T)}$$

Recalling that if $LR \leq \alpha$ for a predetermined significance level $\alpha$, then $H_0$ may be rejected. The error detection system 104 may therefore minimize LR over all possible $O \in D$, and may therefore predict a minimizer O* as the anomaly using the following model:

$$O^* = \underset{O \in D, |O| \leq \varepsilon}{\text{argmin}} \frac{P(D | T)}{P(D_O^\mathcal{P} | T)}$$

Consistent with one or more embodiments above, the minimizer formula may be used to selectively identify one or more entries for selective removal from an input table to generate one or more modified tables.

It will be understood that in one or more embodiments, $P(D|T)$ and $P(D_O^\mathcal{P}|T)$ may not be evaluated directly, as it is unlikely to draw identical tables from T that are identical to either D or $D_O^\mathcal{P}$. Instead, the error detection system 104 may introduce metric functions (m) to formalize a notion of likeness by mapping tables D and T to numeric quantities so that $P(D|T)$ and $P(D_O^\mathcal{P}|T)$ may be estimated directly. For instance, this may be applied to the example discussed above in connection with FIG. 2A in which differences between spelling of names are quantified using pair-wise edit-distance (MPD). Other tables may be quantified in other ways. Additional examples in which metric functions (m) are applied to different types of tables is discussed below.

Similar to one or more embodiments discussed above, the error detection system 104 may similarly apply a subsetting process to training tables (T) to further refine the determination of the likelihood ratio and provide additional confidence in identifying errors found within select entries of dataset (D). In particular, T may be subsetted by removing tables or columns that do not share similar features as D. The subset of training tables may be expressed as $S_D^F(T)$ (or more simply S(T)). Thus, when subsetting the training tables, the likelihood ratio (LR) may be expressed as:

$$LR = \frac{P(D \mid S(T))}{P(D_O^{\mathcal{P}} \mid S(T))}$$

In one or more embodiments, the error detection system 104 may minimize LR over all possible subsets while subsetting, resulting in a minimizer of the LR ratio expressed as:

$$O^* = \operatorname*{argmin}_{O \in D, |O| \leq \varepsilon} \frac{P_m(D \mid S_D^F(T))}{P_m(D_O^{\mathcal{P}} \mid S_D^F(T))}$$

where ε indicates the maximum perturbation value, $S_D^F(T)$ refers to the subset function that selects tables like D in T based on featurization (F) and $P_m$ refers to the metric function to estimate P(D|T).

In one or more embodiments, the error detection system 104 can configure one or more models in maximizing the surprising discoveries to identify errors within tables. For instance, given a target error class (E), target tables (D), a training corpus (T), a configuration space of metric functions (M), featurizations (F), and perturbation (P), the error detection system 104 may find (for a fixed significance level α) the configuration:

$$(m, F, \mathcal{P}) \in (M, F, P)$$

that maximizes surprising discoveries, defined as:

$$\operatorname*{argmax}_{(m, F, \mathcal{P}) \in (M, F, P)} \left| \left\{ d \mid d \in D, \min_{O \in D, |O| \leq \varepsilon} \frac{P_m(D \mid S_d^F(T))}{P_m(D_O^{\mathcal{P}} \mid S_d^F(T))} < \alpha \right\} \right|$$

In one or more embodiments, the error detection system 104 may additionally perform smoothing across a distribution of values from a dataset. For instance, by modifying how data is described, the error detection system 104, may utilize range-based predicates to provide smoother distributions of values. In particular, the error detection system 104 may bunch or group data together to make the distribution more robust reliable. Instead of evaluating individual datapoints, the error detection system 104 may consider small ranges of points. The error detection system 104 may consider numbers of values and variance between the values to determine how big of a range to smooth. This may involve applying one or more window functions to the distribution of values. The error detection system 104 may alternatively perform other techniques to smooth the values to provide more useful results.

While application of the hypothesis tests, identifying a subset that minimizes an LR value, and further subsetting the training tables are applicable to a variety of implementations of the error detection system 104, the error detection system 104 may nonetheless be slightly modified when analyzing datasets of different types and to identify different types of errors. For example, the error detection system 104 may apply a slightly different algorithm to determine the LR value depending on the type of error being identified. Examples of some of the following LR equations are provided below.

For example, where the error detection system 104 is applied to identify numeric outliers, the error detection system 104 may apply algorithms such as standard deviations or median absolute deviations (MAD) to identify certain outliers. In the example of using a maximum MAD (maxMAD) determination of a numeric column (C) and perturbed numeric column ($C_O^{\mathcal{P}}$) and considering the aforementioned (m, F, $\mathcal{P}$) configuration, the LR equation may be expressed as:

$$\frac{P_m(D \mid S_D^F(T))}{P_m(D_O^{\mathcal{P}} \mid S_D^F(T))} = \frac{|\{D \mid D \in S_D^F(T), \operatorname{maxMAD}(D) \geq \theta_1, \operatorname{maxMAD}(D_O^{\mathcal{P}}) \leq \theta_2\}|}{|\{D \mid D \in S_D^F(T), \operatorname{maxMAD}(D) \geq \theta_2\}|}$$

where $\theta_1 = \operatorname{maxMAD}(C)$ and $\theta_2 = \operatorname{maxMAD}(C_O^{\mathcal{P}})$.

As another example, where the error detection system 104 is applied to identify spelling errors, the error detection system 104 may apply algorithms such as minimum pairwise edit distance (MPD) as a metric function (m). In this example, the LR equation may be expressed as:

$$\frac{P_m(D \mid S_D^F(T))}{P_m(D_O^{\mathcal{P}} \mid S_D^F(T))} = \frac{|\{D \mid D \in S_d^F(T), MPD(D) \leq \theta_1, MPD(D_O^{\mathcal{P}}) \geq \theta_2\}|}{|\{D \mid D \in S_d^F(T), MPD(D) \leq \theta_2\}|}$$

where $\theta_1 = \operatorname{MPD}(C)$ and $\theta_2 = \operatorname{MPD}(C_O^{\mathcal{P}})$ computed from a column of entries.

As a further example, where the error detection system 104 is applied to identify uniqueness violations, the error detection system 104 may use uniqueness-ratio (UR) functions as the metric function (m) and applied to a column (C). UR(C) may be defined as a ratio of distinct values within C over a number of total values within C. In this example, the LR equation may be expressed as:

$$\frac{P_m(D \mid S_D^F(T))}{P_m(D_O^{\mathcal{P}} \mid S_D^F(T))} = \frac{|\{D \mid D \in S_d^F(T), UR(D) \leq \theta_1, UR(D_O^{\mathcal{P}}) \geq \theta_2\}|}{|\{D \mid D \in S_d^F(T), UR(D) \leq \theta_2\}|}$$

where $\theta_1 = \operatorname{UR}(C)$ and $\theta_2 = \operatorname{UR}(C_O^{\mathcal{P}})$ computed from a column of entries.

As another example, where the error detection system 104 is applied to identify functional dependency (FD) violations, the error detection system 104 may use FD-compliance ratio (FR) functions as the metric function (m) applied to multiple columns ($C_1, C_2$). For example, allowing u and v to refer to two rows of a table (D), and u(C) and v(C) refer to values of u and v in the columns, the FD-compliance-ratio of an FD candidate ($C_1 \rightarrow C_r$) over table (D), denoted by $FR_D(C_1, C_r)$ may be defined as follows:

$$FR_D(C_1, C_R) = \frac{|\{(u(C_1), u(C_R)) \mid \nexists u, v \in D, u(C_1) = v(C_1), u(C_r) \neq v(C_r)\}|}{|\{(u(C_1), u(C_r)) \mid u \in D\}|}$$

In this example, the LR equation may be expressed as:

$$\frac{P_m(D \mid S_D^F(T))}{P_m(D_O^p \mid S_D^F(T))} = \frac{\left|\left\{\begin{array}{c}(C_1, C_r) \mid D \in S_d^F(T), C_1, C_r \in D, \\ FR_D(C_1, C_R) \leq \theta_1, FR_{D_O^p}(C_1, C_R) \geq \theta_2\end{array}\right\}\right|}{|\{(C_1, C_r) \mid D \in S_d^F(T), C_1, C_r \in D, FR_D(C_1, C_R) \leq \theta_2\}|}$$

where $\theta_1 = FR_T(C_1, C_R)$ and $\theta_2 = F^R T_O^p(C_1, C_R)$.

Identifying errors within tables in accordance with the above examples yields significantly more accurate results than conventional models applied to similar tables. For example, in experiments conducts using an index of 135 million training tables extracted from the web and a further set of 3 million training tables from Wikipedia, the above-described model of utilizing a combination of hypothesis tests and subsetting performed more accurately than a variety of conventional models. Indeed, using hypothesis tests, with and without subsetting the training tables, performed better than models including commercial spell checking applications, Fuzzy-Cluster models, maximum standard deviation models, maximum MAD models, unique row-ratio models, unique value-ratio models, and other conventional models.

Figure 5:
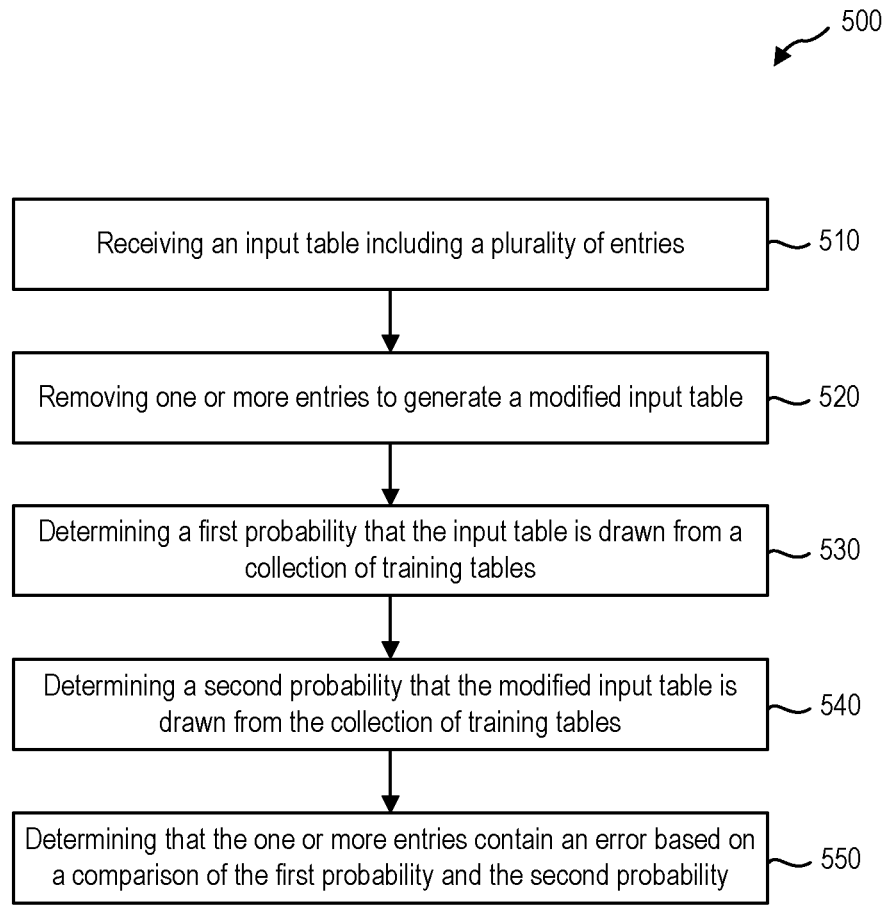
FIG. 5 illustrates an example method of automatically identifying errors within a dataset in accordance with one or more implementations.
Figure 6:
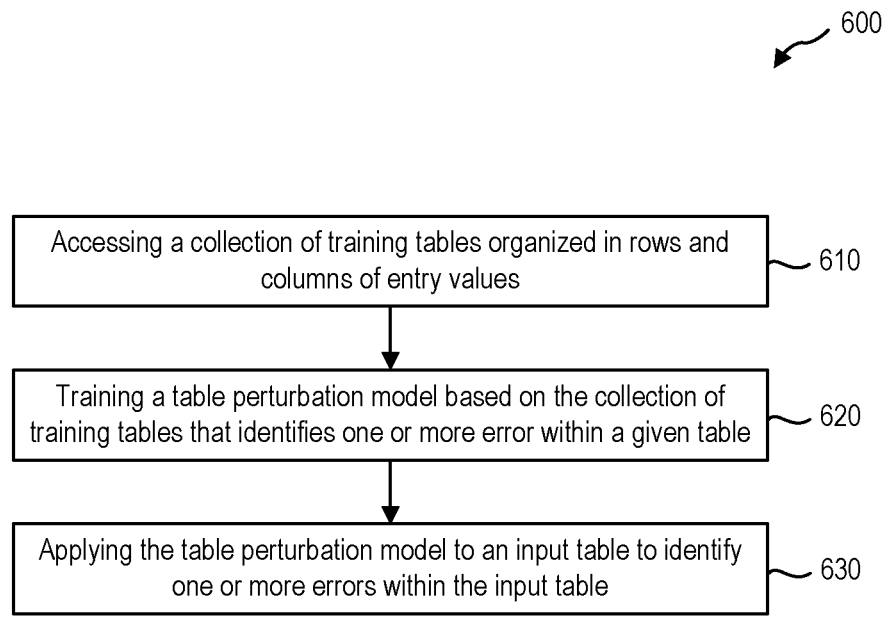
FIG. 6 illustrates an example method of training a dataset perturbation model for automatically identifying errors within a given dataset in accordance with one or more implementations.

Turning now to FIGS. 5-6, these figures illustrate example flowcharts including series of acts for using hypothesis tests to identify predicted errors within tables and other structured datasets. While FIGS. 5-6 illustrate acts according to one or more embodiments, alternative embodiments may omit, add to, reorder, and/or modify any of the acts shown in FIGS. 5-6. The acts of FIGS. 5-6 can be performed as part of a method. Alternatively, a non-transitory computer-readable medium can include instructions that, when executed by one or more processors, cause a computing device to perform the acts of FIGS. 5-6. In still further embodiments, a system can perform the acts of FIGS. 5-6.

FIG. 5 illustrates a series of acts 500 for identifying errors within tables in accordance with one or more embodiments described herein. As shown in FIG. 5, the series of acts 500 includes an act 510 of receiving an input table including a plurality of entries. For instance, the act 510 may include receiving an input table comprising a plurality of entries where each entry of the plurality of entries includes an associated value.

As further shown, the series of acts 500 may include an act 520 of removing one or more entries to generate a modified input table. For example, the act 520 may include removing one or more entries from the plurality of entries to generate a modified input table. In one or more implementations, the series of acts 500 includes selectively identifying the one or more entries from the plurality of entries based on outlying values for the one or more entries relative to values of additional entries from the plurality of entries.

The series of acts 500 may further include an act 530 of determining a first probability that the input table is drawn from a collection of input tables. The series of acts 500 may further include an act 540 of determining a second probability that the input table is drawn from the collection of training tables.

As further shown, the series of acts 500 may include an act 550 of determining that the one or more entries contain an error based on a comparison of the first probability and the second probability. For example, the act 550 may include determining that the one or more entries removed from the input table contain an error based on a comparison of the first probability and the second probability. In one or more implementations, determining or identifying the error includes calculating a ratio between the first probability and the second probability and determining that the one or more entries contain the error based on the calculated ratio. Moreover, in one or more implementations, the series of acts 500 includes tagging the one or more entries of the input table and providing an indication of the tagging via a graphical user interface of a client device in conjunction with a presentation of the input table.

In one or more implementations, the series of acts 500 include identifying plurality of training tables by identifying a subset of training tables from a collection of training tables based on one or more shared features of the input table and the subset of training tables. For example, the one or more shared features may include one or more of a datatype of the plurality of entries, a number of entries from the plurality of entries, a number of rows of entries from the plurality of entries, or a value prevalence associated with values from the plurality of entries.

In one or more embodiments, determining the first probability that the input table is drawn from the plurality of training tables includes determining the first probability based on a comparison of entries of the input table and the subset of training tables. In addition, in one or more embodiments, determining the second probability that the modified input table is drawn from the plurality of training tables includes determining the second probability based on a comparison of entries of the modified input table and the subset of training tables.

In one or more implementations, the series of acts 500 includes identifying a maximum perturbation value for generating the modified input table, the maximum perturbation value indicating a maximum number or a maximum percentage of entries to remove from the plurality of entries when generating the modified input table. The series of acts 500 may further include selectively identifying a number of the one or more entries to remove from the plurality of entries based on the maximum perturbation value.

In one or more embodiments, the series of acts 500 includes identifying the one or more entries by applying a minimization model to the input table, wherein the minimization model identifies the one or more entries based on a minimum expected ratio between the first probability and the second probability. In one or more embodiments described herein, this minimization model refers to a model for minimizing a likelihood ratio equation (e.g., a likelihood ratio minimization model). Nevertheless, the minimization model may be implemented in a variety of ways.

As a first example, the series of acts 500 may include applying a likelihood ratio minimization model over a plurality of subsets of the input table trained to identify a predetermined number of numeric outliers. In particular, the likelihood ratio minimization model may be trained to identify the predetermined number of numeric outliers that, when removed from the input table, corresponds to the modified input table predicted to minimize a ratio between the first probability and the second probability.

As another example, the series of acts 500 may include applying a likelihood ratio minimization model over a plurality of subsets of the input table trained to identify a predetermined number of text-based entries based on a minimum pair-wise edit distance between the predetermined number of text-based entries. In particular, the likelihood ratio minimization model may be trained to identify the predetermined number of text-based entries that, when removed from the input table, corresponds to the modified input table predicted to minimize a ratio between the first probability and the second probability.

As a further example, the series of acts 500 may include applying a likelihood ratio minimization model over a plurality of subsets of the input table trained to identify a predetermined number of uniqueness violation entries based on a uniqueness ratio-functions applied to a column of values from the input table. In particular, the likelihood ratio minimization model may be trained to identify the predetermined number of uniqueness violation entries that, when removed from the input table, corresponds to the modified input table predicted to minimize a ratio between the first probability and the second probability.

As yet another example, the series of acts 500 may include applying a likelihood ratio minimization model over a plurality of subsets of the input table trained to identify a predetermined number of functional dependency (FD) violation entries based on an FD-compliance ratio function applied to multiple columns from the input table. The likelihood ratio minimization model may be trained to identify the predetermined number of FD violation entries that, when removed from the input table, corresponds to the modified input table predicted to minimize a ratio between the first probability and the second probability.

FIG. 6 illustrates another series of acts 600 for identifying errors within tables in accordance with one or more embodiments described herein. As shown in FIG. 6, the series of acts 600 may include an act 610 of accessing a collection of training tables organized in rows and columns of entry values. For example, the act 610 may include accessing a collection of training tables where the collection of training tables includes a plurality of training tables organized in rows and columns of entry values.

As further shown, the series of acts 600 may include an act 620 of training a table perturbation model based on the collection of training tables that identifies one or more errors within a given table. For example, the act 620 may include training a table perturbation model based on the collection of training tables that, when applied to a given table, selectively identifies one or more errors within entries of the given table. In particular, the training perturbation model may identify one or more errors by generating a modified table by removing one or more entries from the given table, determining a first probability that the given table is drawn from the collection of training tables, determining a second probability that the modified table is drawn from the collection of training tables, and determining that the one or more entries from the given table contains an error based on a comparison of the first probability and the second probability.

In one or more embodiments, the table perturbation model is further trained to selectively identify the one or more errors within entries of the given table by identifying a subset of training tables from the collection of training tables based on one or more shared features of the given table and the subset of training tables.

The series of acts 600 may include an act 630 of applying the table perturbation model to an input table to identify one or more errors within the input table. The act 630 may include applying the table perturbation model to an input table including a plurality of table entries to identify one or more errors within the plurality of table entries. In one or more embodiments, the series of acts 630 includes providing the table perturbation model to a computing device to enable the computing device to locally apply the table perturbation model to an input table accessible to the computing device.

The series of acts 600 may include identifying one or more predicted errors within the plurality of table entries based on applying the table perturbation model to respective columns of the input table. The series of acts 600 may further include tagging one or more entries of the plurality of table entries associated with the identified one or more predicted errors. Furthermore, the series of acts 600 may include providing an indication of tagging via a graphical user interface of a client device in conjunction with a presentation of the input table.

In one or more embodiments, the table perturbation model is further trained to identify a maximum perturbation value for generating the modified table, the maximum perturbation value indicating a maximum number or a maximum percentage of entries to remove from the given table in generating the modified table. The maximum perturbation value may be based on one or more of a number of entries of the given table or a datatype of entries from the given table.

Figure 7:
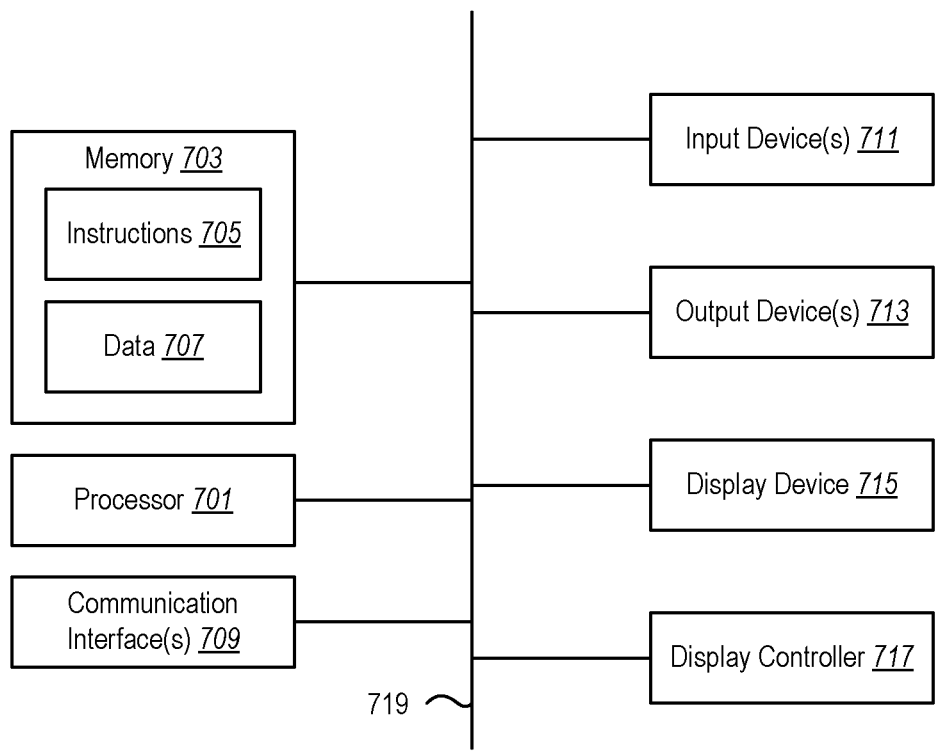
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving an input table comprising a plurality of entries, wherein each entry of the plurality of entries comprises an associated value;
removing one or more entries from the plurality of entries to generate a modified input table;
determining a first metric of similarity based on a comparison of a first distribution of values from the input table and distributions of values from a plurality of training tables, the plurality of training tables including a set of reference tables presumed to have clean data;
determining a second metric of similarity based on a comparison of a second distribution of values from the modified input table and distributions of values from the plurality of training tables:
determining a first probability that the input table is drawn from a plurality of training tables based on the first metric of similarity;
determining a second probability that the modified input table is drawn from the plurality of training tables based on the second metric of similarity;
determining that the one or more entries removed from the input table contain an error based on a comparison of the first probability and the second probability; and
providing, via a graphical user interface of a client device, an indication of the error in conjunction with a display of the one or more entries.

2. The method of claim 1, further comprising identifying the plurality of training tables by identifying a subset of training tables from a collection of training tables based on one or more shared features of the input table and the subset of training tables.

3. The method of claim 2, wherein the one or more shared features comprise one or more of:
a datatype of the plurality of entries;
a number of entries from the plurality of entries;
a number of rows of entries from the plurality of entries; or
a value prevalence associated with values from the plurality of entries.

4. The method of claim 1, further comprising selectively identifying the one or more entries from the plurality of entries based on outlying values for the one or more entries relative to values of additional entries from the plurality of entries.

5. The method of claim 1, further comprising:
identifying a threshold perturbation value for generating the modified input table, the maximum perturbation value indicating a threshold number or a threshold percentage of entries to remove from the plurality of entries when generating the modified input table; and
selectively identifying a number of the one or more entries to remove from the plurality of entries based on the threshold perturbation value.

6. The method of claim 1, further comprising identifying the one or more entries by applying a minimization model to the input table, wherein the minimization model identifies the one or more entries based on a threshold expected ratio between the first probability and the second probability.

7. The method of claim 1, wherein determining that the one or more entries removed from the input table contain the error comprises:
  calculating a ratio between the first probability and the second probability; and
  determining that the one or more entries contain the error based on the calculated ratio.

8. The method of claim 1, further comprising:
  tagging the one or more entries of the input table; and
  providing an indication of the tagging via the graphical user interface of the client device in conjunction with a presentation of the input table.

9. A method, comprising:
  accessing a collection of training tables, wherein the collection of training tables comprises a plurality of training tables organized in rows and columns of entry values, the collection of training tables includes a set of reference tables presumed to have clean data; and
  training a table perturbation model based on the collection of training tables that, when applied to a given table, selectively identifies one or more errors within entries of the given table by:
    generating a modified table by removing one or more entries from the given table;
    determining a first metric of similarity based on a comparison of a first distribution of values from the given table and distributions of values from the collection of training tables;
    determining a second metric of similarity based on a comparison of a second distribution of values from the modified table and distributions of values from the collection of training tables;
    determining a first probability that the given table is drawn from the collection of training tables based on the first metric of similarity;
    determining a second probability that the modified table is drawn from the collection of training tables based on the second metric of similarity; and
    determining that the one or more entries from the given table contains an error based on a comparison of the first probability and the second probability
  applying the table perturbation model to an input table comprising a plurality of table entries to identify one or more errors within the plurality of table entries.

10. The method of claim 9, wherein applying the table perturbation model to the input table causes a client device to provide, via a graphical user interface, an indication of the one or more errors in conjunction with a display of the plurality of table entries.

11. The method of claim 10, further comprising:
  identifying the one or more errors within the plurality of table entries based on applying the table perturbation model to respective columns of the input table;
  tagging one or more entries of the plurality of table entries associated with the identified one or more errors; and
  providing an indication of tagging via the graphical user interface of the client device in conjunction with a presentation of the input table.

12. The method of claim 9, wherein the table perturbation model is further trained to selectively identify the one or more errors within entries of the given table by identifying a subset of training tables from the collection of training tables based on one or more shared features of the given table and the subset of training tables.

13. The method of claim 9, further comprising providing the table perturbation model to a computing device to enable the computing device to locally apply the table perturbation model to an input table accessible to the computing device.

14. The method of claim 9, wherein the table perturbation model is further trained to:
  identify a threshold perturbation value for generating the modified table, the maximum perturbation value indicating a threshold number or a threshold percentage of entries to remove from the given table in generating the modified table, wherein the threshold perturbation value is based on one or more of a number of entries of the given table or a datatype of entries from the given table.

15. A system, comprising:
  one or more processors;
  memory in electronic communication with the one or more processors; and
  instructions stored in the memory, the instructions being executable by the one or more processors to cause a computing device to:
    receive an input table comprising a plurality of entries, wherein each entry of the plurality of entries comprises an associated value;
    remove one or more entries from the plurality of entries to generate a modified input table;
    determine a first metric of similarity based on a comparison of a first distribution of values from the input table and distributions of values from a plurality of training tables, the plurality of training tables including a set of reference tables presumed to have clean data;
    determine a second metric of similarity based on a comparison of a second distribution of values from the modified input table and distributions of values from the plurality of training tables;
    determine a first probability that the input table is drawn from a plurality of training tables based on the first metric of similarity;
    determine a second probability that the modified input table is drawn from the plurality of training tables based on the second metric of similarity;
    determine that the one or more entries removed from the input table contain an error based on a comparison of the first probability and the second probability; and
    provide, via a graphical user interface of a client device, an indication of the error in conjunction with a display of the one or more entries.

16. The system of claim 15, further comprising instructions that, when executed by the one or more processors, cause the computing device to:
  identify the plurality of training tables by identifying a subset of training tables from a collection of training tables based on one or more shared features of the input table and the subset of training tables;
  wherein determining the first probability that the input table is drawn from the plurality of training tables comprises determining the first probability based on a comparison of entries of the input table and the subset of training tables; and
  wherein determining the second probability that the modified input table is drawn from the plurality of training tables comprises determining the second probability based on a comparison of entries of the modified input table and the subset of training tables.

17. The system of claim 15, further comprising instructions that, when executed by the one or more processors, cause the computing device to:

apply a likelihood ratio minimization model over a plurality of subsets of the input table trained to identify a predetermined number of numeric outliers that, when removed from the input table, corresponds to the modified input table predicted to minimize a ratio between the first probability and the second probability.

18. The system of claim 15, further comprising instructions that, when executed by the one or more processors, cause the computing device to:

apply a likelihood ratio minimization model over a plurality of subsets of the input table trained to identify a predetermined number of text-based entries based on a threshold pair-wise edit distance between the predetermined number of text-based entries that, when removed from the input table, corresponds to the modified input table predicted to minimize a ratio between the first probability and the second probability.

19. The system of claim 15, further comprising instructions that, when executed by the one or more processors, cause the computing device to:

apply a likelihood ratio minimization model over a plurality of subsets of the input table trained to identify a predetermined number of uniqueness violation entries based on a uniqueness ratio-functions applied to a column of values from the input table that, when removed from the input table, corresponds to the modified input table predicted to minimize a ratio between the first probability and the second probability.

20. The system of claim 15, further comprising instructions that, when executed by the one or more processors, cause the computing device to:

apply a likelihood ratio minimization model over a plurality of subsets of the input table trained to identify a predetermined number of functional dependency (FD) violation entries based on an FD-compliance ratio function applied to multiple columns from the input table that, when removed from the input table, corresponds to the modified input table predicted to minimize a ratio between the first probability and the second probability.

* * * * *